United States Patent
Borkovic

(10) Patent No.: US 11,775,299 B1
(45) Date of Patent: Oct. 3, 2023

(54) VECTOR CLOCKS FOR HIGHLY CONCURRENT EXECUTION ENGINES

(71) Applicant: Amazon Technologies, Inc., Seattle, WA (US)

(72) Inventor: Drazen Borkovic, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 183 days.

(21) Appl. No.: 17/215,912

(22) Filed: Mar. 29, 2021

(51) Int. Cl.
*G06F 9/30* (2018.01)
*G06F 1/10* (2006.01)
*G06N 3/08* (2023.01)
*G06F 9/38* (2018.01)

(52) U.S. Cl.
CPC ............ *G06F 9/30036* (2013.01); *G06F 1/10* (2013.01); *G06F 9/3001* (2013.01); *G06F 9/3836* (2013.01); *G06N 3/08* (2013.01)

(58) Field of Classification Search
CPC ...... G06F 9/30036; G06F 1/10; G06F 9/3001; G06F 9/3836; G06N 3/08
See application file for complete search history.

(56) References Cited

U.S. PATENT DOCUMENTS

| | | | | |
|---|---|---|---|---|
| 5,491,823 | A * | 2/1996 | Ruttenberg | G06F 8/452 717/161 |
| 6,031,987 | A * | 2/2000 | Damani | G06F 30/20 709/201 |
| 2003/0121027 | A1* | 6/2003 | Hines | G06F 11/362 719/321 |
| 2007/0245312 | A1* | 10/2007 | Qadeer | G06F 11/3632 717/124 |
| 2008/0288834 | A1* | 11/2008 | Manovit | G06F 11/3612 703/21 |
| 2016/0071233 | A1* | 3/2016 | Macko | G06T 11/206 345/440 |
| 2019/0294968 | A1* | 9/2019 | Vantrease | G06N 3/0481 |

* cited by examiner

*Primary Examiner* — Farley Abad
(74) *Attorney, Agent, or Firm* — Kilpatrick Townsend & Stockton LLP

(57) ABSTRACT

Disclosed are methods, systems, and other techniques for modeling concurrency between a set of nodes to be executed on a set of execution engines of an integrated circuit device. A computation graph that includes the set of nodes is received. A set of edges connecting the set of nodes are determined based on the computation graph. An edge type for each of the set of edges is determined based on the computation graph, the edge type indicating a type of synchronization between connected nodes. A vector clock is generated for each of the set of nodes, the vector clock for a particular node being calculated based on the vector clock for each connected preceding node and the edge type for the one of the set of edges that connects each connected preceding node and the particular node.

17 Claims, 14 Drawing Sheets

VECTOR CLOCKS FOR HIGHLY CONCURRENT EXECUTION ENGINES

BACKGROUND

Integrated circuit devices, such as processors and accelerators, can include multiple execution engines. For example, an integrated circuit device can include parallel execution engines that are capable of performing large, multi-stage computations, such as convolutions. As another example, an integrated circuit device can include execution engines for more specific operations, such as accumulating values or performing floating point math. The data on which the execution engines operate can be retrieved from a memory of the integrated circuit device. Results produced by the execution engines can further be written to the memory. The memory may be limited in size, due to considerations such as the available space on the chip for the memory.

In some instances, integrated circuit devices having multiple execution engines can be used to execute operations of an artificial neural network. Artificial neural networks are computing systems with an architecture based on biological neural networks. Artificial neural networks can be trained using training data to learn how to perform a certain task, such as identifying or classifying physical objects, activities, characters, etc., from images or videos. An artificial neural network, such as a deep neural network, includes multiple layers of processing nodes. Each processing node (or simply "node") in a layer can perform computations on input data generated by processing nodes in a preceding layer to generate output data. For example, a processing node may perform a set of arithmetic operations, such as multiplications and additions to generate an intermediate output, or perform post-processing operations on the intermediate output to generate a final output. An artificial neural network may include thousands or more of processing nodes and millions or more of parameters.

BRIEF DESCRIPTION OF THE DRAWINGS

Various embodiments in accordance with the present disclosure will be described with reference to the drawings, in which.

DETAILED DESCRIPTION

Figure 1:
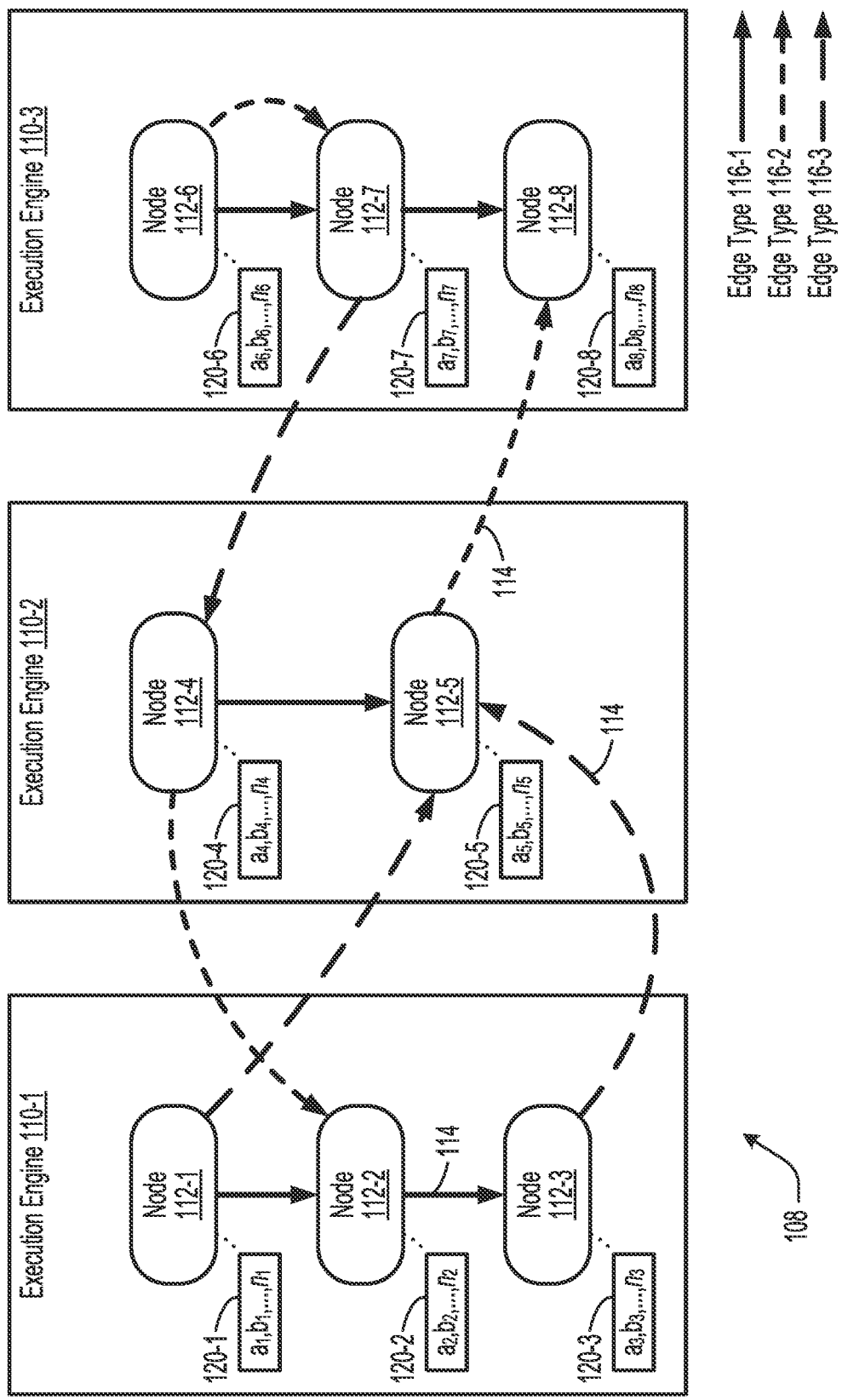
FIG. 1 illustrates an example of a computation graph that includes nodes and execution engines.

The operations of an integrated circuit device such as a processor can be directed by instructions, which can be generated for the integrated circuit device by a compiler. A compiler is a software program that transforms programs written in a human-readable programming language into a machine language that can be understood by the integrated circuit device. The output of a compiler can be referred to as program code, program instructions, or machine instructions, among other examples.

When an integrated circuit device includes multiple execution engines, in various examples, the compiler for the device can produce sets of instructions for each execution engine. The instructions for an execution engine can includes steps such as reading data from memory of the device, performing a computation on the data, and writing a result of the computation back to the memory of the device. In some examples, the execution engines can asynchronously and independently execute respective sets of instructions so that the execution engines can operate in parallel.

For operations executed on highly concurrent execution engines, two operations may be executed with varying levels of concurrency, whether they are executed by the same or different execution engines. A particular level of concurrency between two operations may be determined based on a data dependency between the operations (e.g., a result computed by one operation may be needed as the input of the other operation), a resource dependency between the operations (e.g., one operation may need to write to a memory location that the other operation is using), an engine dependency between the operations (e.g., both operations may need to be executed by the same execution engine, and therefore are limited by the number of data streams the execution engine can handle), among other possibilities.

When the operations of the execution engines of an integrated circuit device can have concurrencies and dependencies such as those described above, a compiler for the device can capture them, for example, in a computation or dataflow graph. In a computation graph, nodes in the graph can represent operations or sets of operations to be performed by individual execution engines. The edges or connections between the nodes can represent concurrencies, dependencies, and needed synchronizations between the operations at the nodes.

In some examples, the integrated circuit device can include synchronization circuitry (e.g., implementing semaphores, queues, or another type of synchronization primitive), which can be used to synchronize the execution engines around an edge. For example, when an edge in the dataflow graph indicates a dependency between two different execution engines, the compiler can output an instruction that activates a semaphore circuit. As another example, the compiler can generate instructions that cause a first execution engine to write a result to a queue, from which a second execution engine can read the result for use in an operation. In some examples, synchronization of execution engines can be achieved through the use of event registers, which can be accessed via a bus, and can therefore only require a few clock cycles to check the status of an event register. In some implementations, barriers may be introduced to synchronize all execution engines having events set in the event registers. Other possibilities are contemplated.

The generation and utilization of computation graphs for synchronizing highly concurrent execution engines of an integrated circuit device are important tasks for achieving high efficiency in many applications, such as, for example, the execution of an artificial neural network on the integrated circuit device. Embodiments described herein address these and other issues by providing systems, methods, and other techniques for modeling concurrency between operations using vector clocks. In some instances, the causal relations between different operations are tracked by generating a vector clock for each operation. As used herein, a vector clock for a particular operation may be a vector that includes a set of n values that allow relationships between the particular operation and other operations (or equivalently, nodes in a computation graph) to be determined.

In some examples, generated vector clocks can allow the compiler to quickly determine a causal relation between two operations. For example, a first operation may be considered to follow a second operation if each of the n values of the vector clock for the first operation is greater than or equal to each corresponding value of the vector clock of the second operation. Alternatively, the second operation may be considered to follow the first operation if each of the n values of the vector clock for the second operation is greater than or equal to each corresponding value of the vector clock of the first operation. If neither of the above are true, then it may be possible for the operations to be performed in either order.

In some implementations, the causal relations between operators, as determined using the generated vector clocks, can be used to determine whether certain event registers can be reused. For example, in some instances, an event register can be reused for a new edge if the start operation associated with the new edge follows the end operation associated with the previous edge with the same event. In some instances, the compiler may determine whether the start operation associated with the new edge follows any end operation associated with any previous edges. In some instances, the compiler may first look to the end operation of the edge with the most-recently assigned event register or to the end operation of the edge with the least-recently assigned event register.

In some implementations, vector clocks are used to determine that a data race condition exists. In some instances, a data race condition may be considered to exist when two operations or instructions that have a possibility of being concurrent either write to at least one common memory address or one operation reads data from a memory address and the other operation writes data to the same memory address. Using vectors clocks, data race conditions between the concurrent operations may be detected, and pairs of operations not having data race conditions may be validated.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computation graph 108 that includes nodes 112 and execution engines 110, in accordance with some embodiments of the present disclosure. Computation graph 108 may be generated by a compiler and can represent various operations (represented by nodes 112) to be performed by an integrated circuit device. In various embodiments, computation graph 108 may alternatively be referred to as a data dependency graph, a dependency graph, a dataflow graph, a neural network graph, among other possibilities. For example, in some embodiments, nodes 112 may represent operations of a neural network that are to be performed on a neural network accelerator.

In some embodiments, the integrated circuit device on which the operations of computation graph 108 are to be performed may include multiple execution engines 110. Examples of types of execution engines 100 that the integrated circuit device can have include a computational array (also referred to herein as a processing engine array or processing element array), an execution engine executing an activation function (also referred to herein as an activation engine), an execution engine executing a pooling operation (also referred to herein as a pooling engine), and a direct memory access (DMA) engine, among other examples.

In some embodiments, each of nodes 112 may represent an operation comprising one or more instructions to be executed by a particular execution engine of execution engines 110. For example, a first node 112-1 may include one or more instructions to be executed by a first execution engine 110-1, a fourth node 112-4 may include one or more instructions to be executed by a second execution engine 110-2, and a sixth node 112-6 may include one or more instructions to be executed by a third execution engine 110-3, and so on.

In some embodiments, execution engines 110 may operate concurrently with each other. For example, in certain implementations, execution engine 110-1 may execute the instruction(s) of node 112-1 concurrently with execution engines 110-2 and 110-3 executing the instructions of nodes 112-4 and 112-6, respectively. Furthermore, in some embodiments, concurrency between two nodes of the same execution engine 110 may be achieved. For example, execution engine 110-1 may execute one or more instructions of node 112-1 concurrently with one or more instructions of nodes 112-2 and 112-3. Examples of concurrency between different operations will be described below.

Nodes 112 may be connected through various edges 114, which may represent synchronization between nodes 112. For example, in some embodiments, each of edges 114 may have one of several possible edge types 116, with each of edge types 116 representing a type of synchronization. As an example, one type of synchronization may be referred to as "Start-to-Start" (S2S) synchronization, in which the operation at the head of the edge (or "end operation") may start after the operation at the tail (or "start operation") of the edge starts. The S2S synchronization exhibits a high level of concurrency between the operations.

As another example, one type of synchronization may be referred to as "Read-End-to-Start" (RE2S) synchronization, in which the end operation may start after the start operation completes reading all of its input data. The RE2S synchronization exhibits a medium level of concurrency between the operations. As another example, one type of synchronization may be referred to as "Write-End-to-Start" (WE2S) synchronization, in which the end operation may start after the start operation completes writing all of its output data. The WE2S synchronization exhibits a low level of concurrency between the operations. As such, the edge type and accordingly the type of synchronization may correspond to a level of concurrency between the operations connected by a particular edge.

In some embodiments, the type of synchronization may further indicate a data or resource dependency between nodes 112. A data dependency can occur, for example, when the operation of one node uses the output of an operation of another node as an input for a computation. A resource dependency can occur, for example, when the operation of one node needs to use a memory location that an operation of another node is also using. For example, one execution engine performing one operation may need to write a value to the memory location, and another execution engine performing the other operation may need to read the value and use the value in a computation. As another example, one execution engine performing one operation may be reading or writing a value to a memory location, and another execution engine performing the other operation may (e.g., due to limited memory being available) need to write a value to the same memory location.

In various examples, each of nodes 112 in computation graph 108 may include at least one input edge, representing inputs to the operation, or at least one output edge, representing an output of the operation. For example, edges 114 connecting nodes 112-1 and 112-4 with node 112-2 may indicate that the results from the operations of nodes 112-1 and 112-4 are inputs to the operation of node 112-2. As another example, edges 114 connecting nodes 112-1, 112-3, and 112-4 with node 112-5 may indicate that the results from the operations of 112-1, 112-3, and 112-4 are inputs to the operation of node 112-5. In some embodiments, when two edges 114 of different edge types are connected between two nodes 112, the less restrictive edge may be removed. As such, in some examples, computation graph 108 may include at most one edge 114 between any two nodes.

In some embodiments, in order to model the concurrency and causal relations among the various operations of computation graph 108, vector clocks 120 may be calculated for each of nodes 112. Vector clocks 120 may each include n values (e.g., integers) with each value corresponding to a different aspect of causality. Upon calculating vector clocks 120, the causal relation between operations/instructions may be quickly determined by comparing the vector clocks of the corresponding nodes. In one example, an operation of a second node may be considered to follow an operation of a first node if the vector clock for the second node is greater than or equal to the vector clock for the first node for each of the n values.

In some embodiments, a vector clock for a particular node may be calculated based on the vector clocks for each connected preceding node and the edge type for the edges connecting each connected preceding node with the particular node. As an example, vector clock 120-2 may be calculated based on vector clock 120-1 (since node 112-1 is a connected preceding node for node 112-2) and edge type 116-1 as well as vector clock 120-4 (since node 112-4 is a connected preceding node for node 112-2) and edge type 116-2. As another example, vector clock 120-5 may be calculated based on vector clock 120-1 (since node 112-1 is a connected preceding node for node 112-5) and edge type 116-3, vector clock 120-3 (since node 112-3 is a connected preceding node for node 112-5) and edge type 116-3, and vector clock 120-4 (since node 112-4 is a connected preceding node for node 112-5) and edge type 116-1.

Vector clocks 120 can be used in a variety of applications for improving the execution of the operations of computation graph 108 on the integrated circuit device. As an example, vector clocks 120 may be used to assign event registers to edges 114, as is described in U.S. patent application Ser. No. 16/585,575 filed on Sep. 27, 2019, the content of which is incorporated herein by reference. As another example, vector clocks 120 may be used to remove redundant edges from edges 114, as is described in U.S. patent application Ser. No. 16/829,331 filed on Mar. 25, 2020, the content of which is incorporated herein by reference. As another example, vector clocks 120 may be used to determine that a data race condition exists, as is described in U.S. patent application Ser. No. 16/824,404 filed on Mar. 19, 2020, the content of which is incorporated herein by reference.

Figure 2:
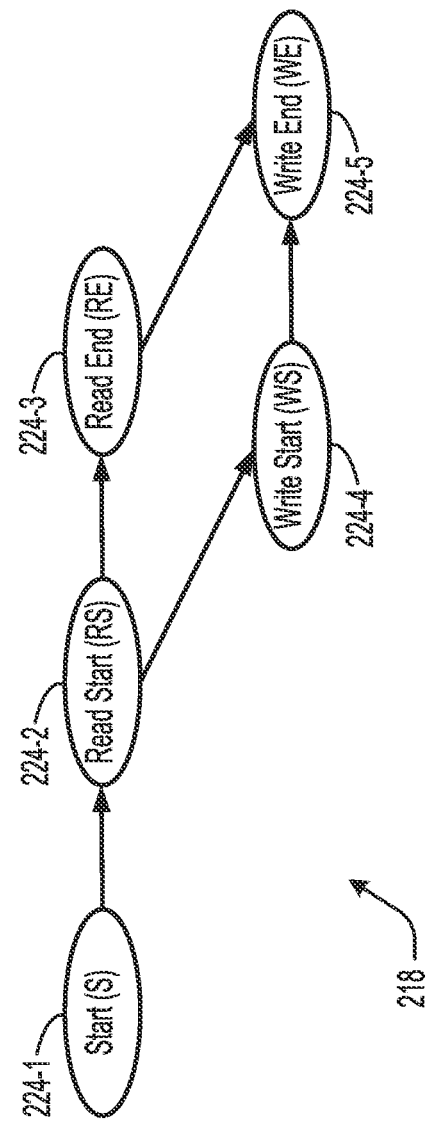
FIG. 2 illustrates an example of an instruction model.

FIG. 2 illustrates an example of an instruction model 218 for a single operation, in accordance with some embodiments of the present disclosure. Instruction model 218 includes multiple instruction phases 224 associated with the execution of the instructions of the operation. Instruction phases 224 may include "Start" (S) (indicated by instruction phase 224-1), "Read Start" (RS) (indicated by instruction phase 224-2), "Read End" (RE) (indicated by instruction phase 224-3), "Write Start" (WS) (indicated by instruction phase 224-4), and "Write End" (WE) (indicated by instruction phase 224-5), among other possibilities.

The start of the instruction/operation (decoding, waiting on events, and semaphores), occurring at S, may precede any reading of input data occurring at RS. Completion of reading, occurring at RE, follows RS. Writing of the first output byte, occurring at WS, may not start before the first input byte, if any, is read at RS. Finally, writing of the last output byte, occurring at WE, follows reading of the last input byte, occurring at RE, and writing of the first input byte, occurring at WS. These causal relations may apply to any instruction, regardless of the computation and regardless of the execution engine. In some instances, the instruction phases RS and RE may be combined into the instruction phase "Read" (R), and the instruction phases WS and WE may be combined into the instruction phase "Write" (W).

FIGS. 3A-3G illustrate various examples of synchronization types that may be represented by different edges, in accordance with some embodiments of the present disclosure. For each of the illustrated examples, instruction phases 324 for a first operation may be denoted by S1 (S for the first operation), RS1 (RS for the first operation), RE1 (RE for the first operation), WS1 (WS for the first operation), and WE1 (WE for the first operation), and instruction phases 324 for a second operation may be denoted by S2 (S for the second operation), RS2 (RS for the second operation), RE2 (RE for the second operation), WS2 (WS for the second operation), and WE2 (WE for the second operation).

Figure 3A:
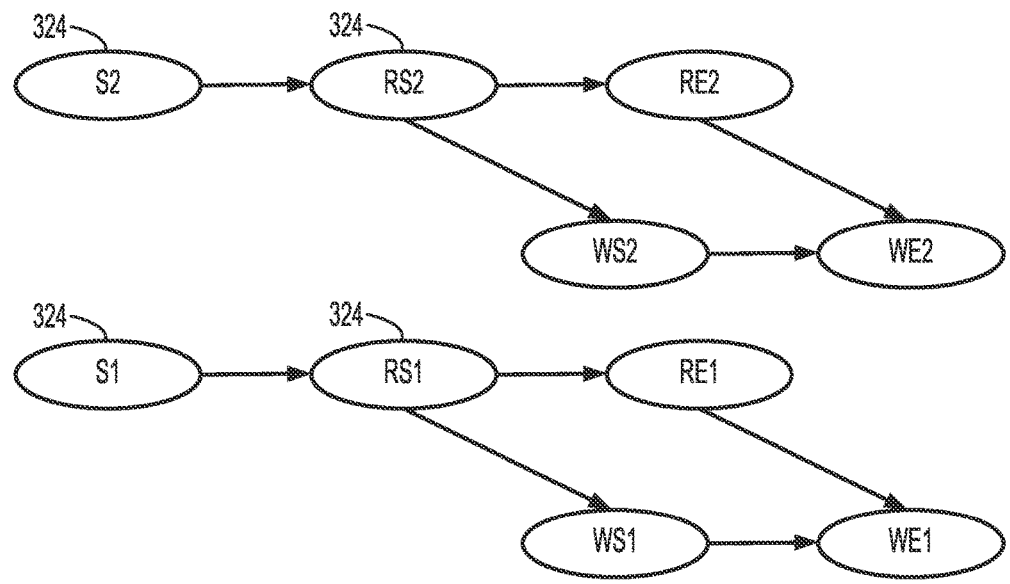
FIGS. 3A-3G illustrate various examples of synchronization types that may be represented by different edges.

FIG. 3A illustrates an example synchronization type for two fully concurrent and independent operations. In some embodiments, the two operations may be fully concurrent when they execute on different engines and there is no signaling between the operations. It should be noted that any instruction phase of the first operation and any instruction phase of the second operation can execute concurrently. This represents maximal concurrency between the two operations.

Figure 3B:
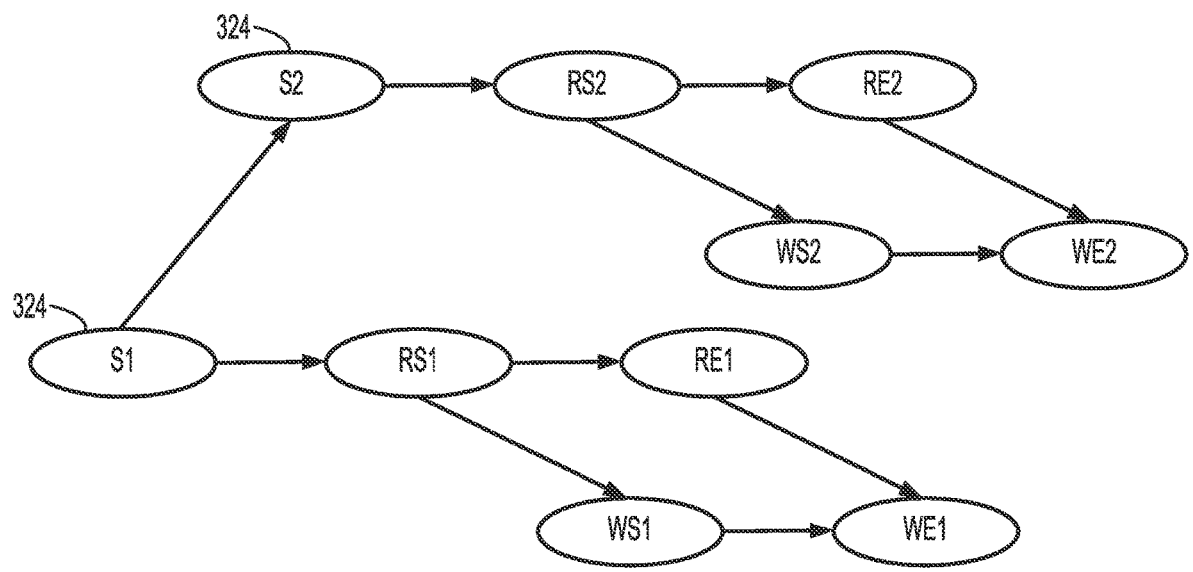

FIG. 3B illustrates an example synchronization type referred to as "Start to Start" (S2S). In some embodiments, two operations related by the S2S synchronization type may be executed by the same execution engine without constraints due to reading or writing of a common partition. For example, the S2S synchronization type may describe the causal relation of two operations that execute on the same execution engine, read completely different partitions, and write to completely different partitions (i.e., no read or write constraints). Note that WS1 and WE1 could execute concurrently with RS2, RE2, WS2, and WE2.

Figure 3C:
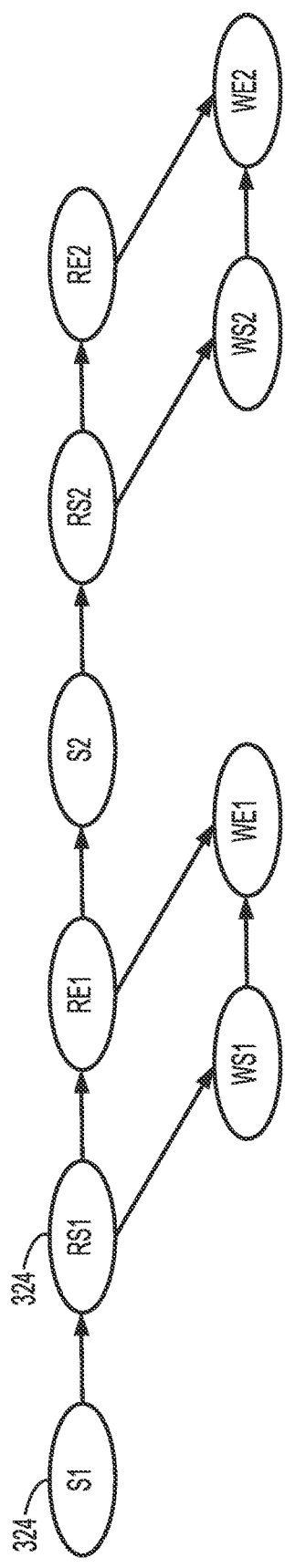

FIG. 3C illustrates an example synchronization type referred to as "Read End to Start" (RE2S) or alternatively as "Read to Start" (R2S). In some embodiments, when two operations are related by the RE2S synchronization type, the second operation waits to start until the first operation reads data. Note the possible concurrency between WS1 or WE1 and S2, RS2, RE2, WS2, or WE2. In some embodiments, this causal order applies to two cases. In the first case, the operations execute on two execution engines. The first operation sends a signal (e.g., event set or semaphore change) at RE, and the second operation waits for the signal (e.g., waits for event set or waits for semaphore change) and then starts. In the second case, the operations execute on one execution engine and read from different memory partitions. The first operation sends a signal at RE, and the second instruction waits for the signal.

Figure 3D:
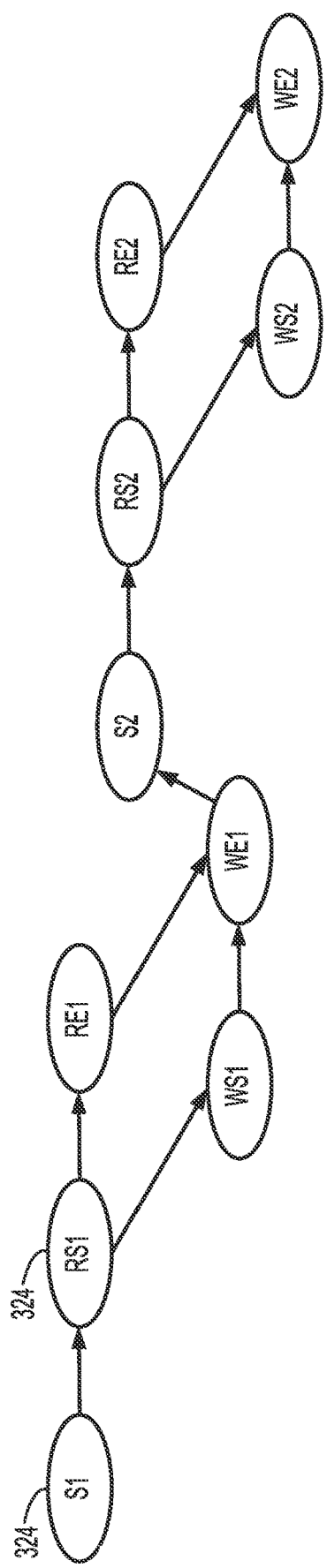

FIG. 3D illustrates an example synchronization type referred to as "Write End to Start" (WE2S) or alternatively as "Write to Start" (W2S). In some embodiments, when two operations are related by the WE2S synchronization type, the second operation starts after the first operation writes data. Thus, the two operations are fully sequential with no concurrency. In some embodiments, this causal order applies to three cases. In the first case, the operations execute on two execution engines. The first operation sends a signal at WE, and the second operation waits for the signal. In the second case, the operations execute on one execution engine. The first operation sends a signal at WE, and the second operation waits for the signal. In the third case, two sequential operations execute on one engine.

Figure 3E:
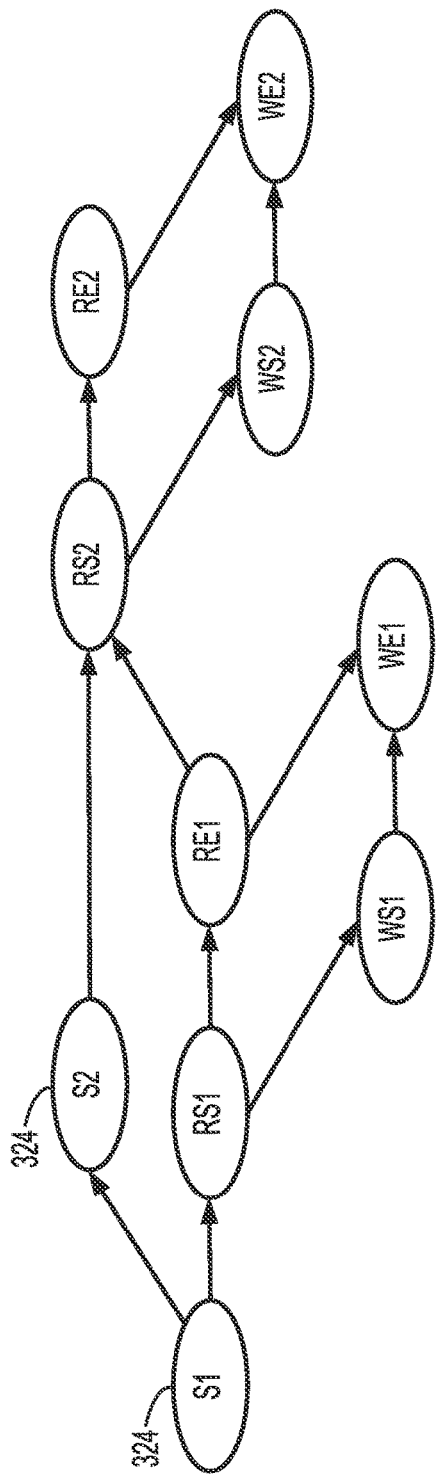

FIG. 3E illustrates an example synchronization type referred to as "Read End to Read Start" (RE2RS). In some embodiments, when two operations are related by the RE2RS synchronization type, the second operation waits to read until the first operation finishes reading. In some embodiments, two operations related by the RE2RS synchronization type may read from a common partition. In some embodiments, this causal order may be for two operations on one execution engine in relaxed order. The operations read from at least one common partition in one memory, i.e., reads are overlapping and writes are non-overlapping. The second operation starts reading its input only after the first operation reads its complete input. In some instances, the reading order applies to data reading of all partitions, including non-common partitions. Note the possible concurrency between WS1 or WE1 and RS2, RE2, WS2, or WE2.

Figure 3F:
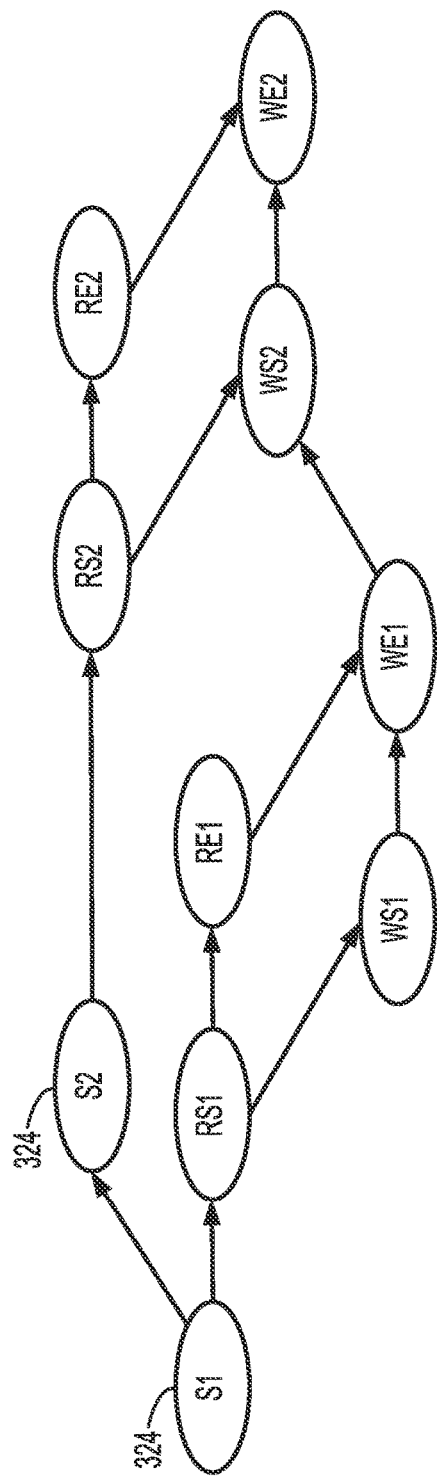

FIG. 3F illustrates an example synchronization type referred to as "Write End to Write Start" (WE2WS). In some embodiments, when two operations are related by the WE2WS synchronization type, the second operation waits to write until the first operation finishes writing. In some embodiments, two operations related by the WE2WS synchronization type may write to at least one common partition in one memory. The second operation starts writing its output only after the first operation writes its complete output. Note that the writing order applies to data writing to all partitions, including non-common partitions. Note the possible concurrency between RS1, RE1, WS1, or WE1 and RS2 or RE2. Compared to RE2RS, RE2RS has higher concurrency when reading is fast and writing is slow, and WE2WS has higher concurrency when reading is slow and writing is fast.

Figure 3G:
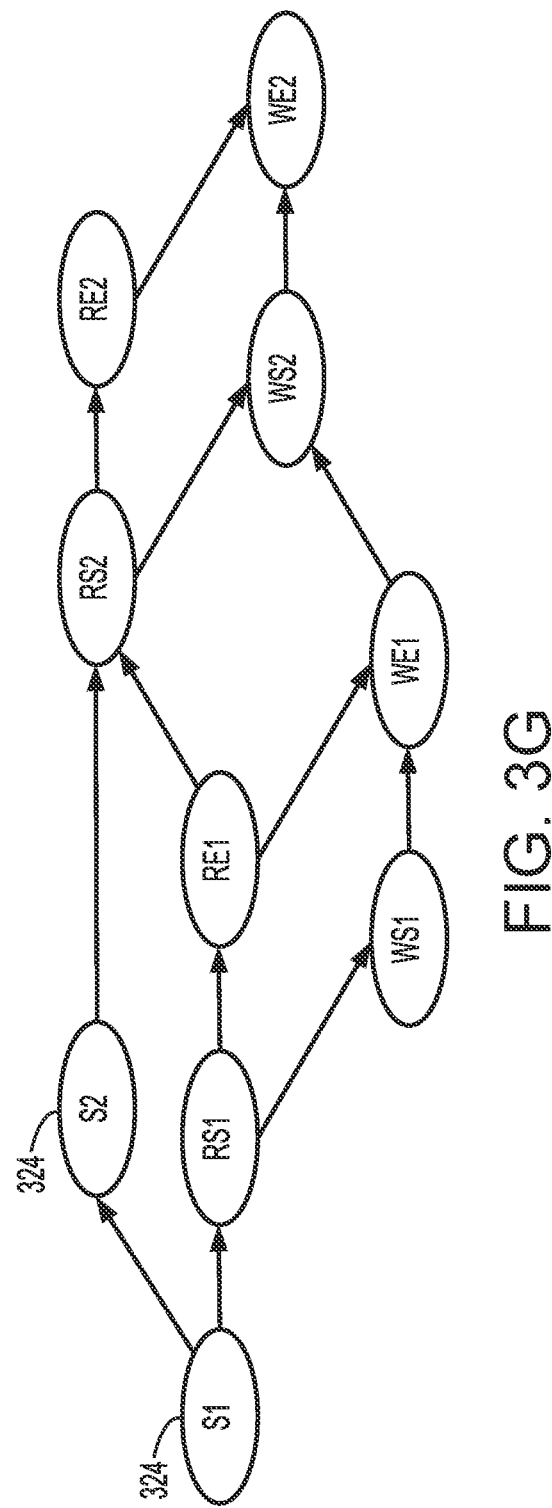

FIG. 3G illustrates an example synchronization type referred to as "Read End to Read Start and Write End to Write Start" (RE2RS+WE2WS). In some embodiments, when two operations are related by the RE2RS+WE2WS synchronization type, the second operation waits to read until the first operation finishes reading and the second operation waits to write until the first operation finishes writing. Note the possible concurrency between RE1 or RS2 and WS1 or WE1. RE2RS+WE2WS has a lower level of concurrency than either of RE2RS and WE2WS. In some embodiments, this causal order applies to two operations that represent two consecutive DMA transactions on one DMA queue. Reading of the first data could complete before writing of the second data starts if the interconnect carrying the DMA traffic has high latency and a significant amount of buffering.

Figure 4:
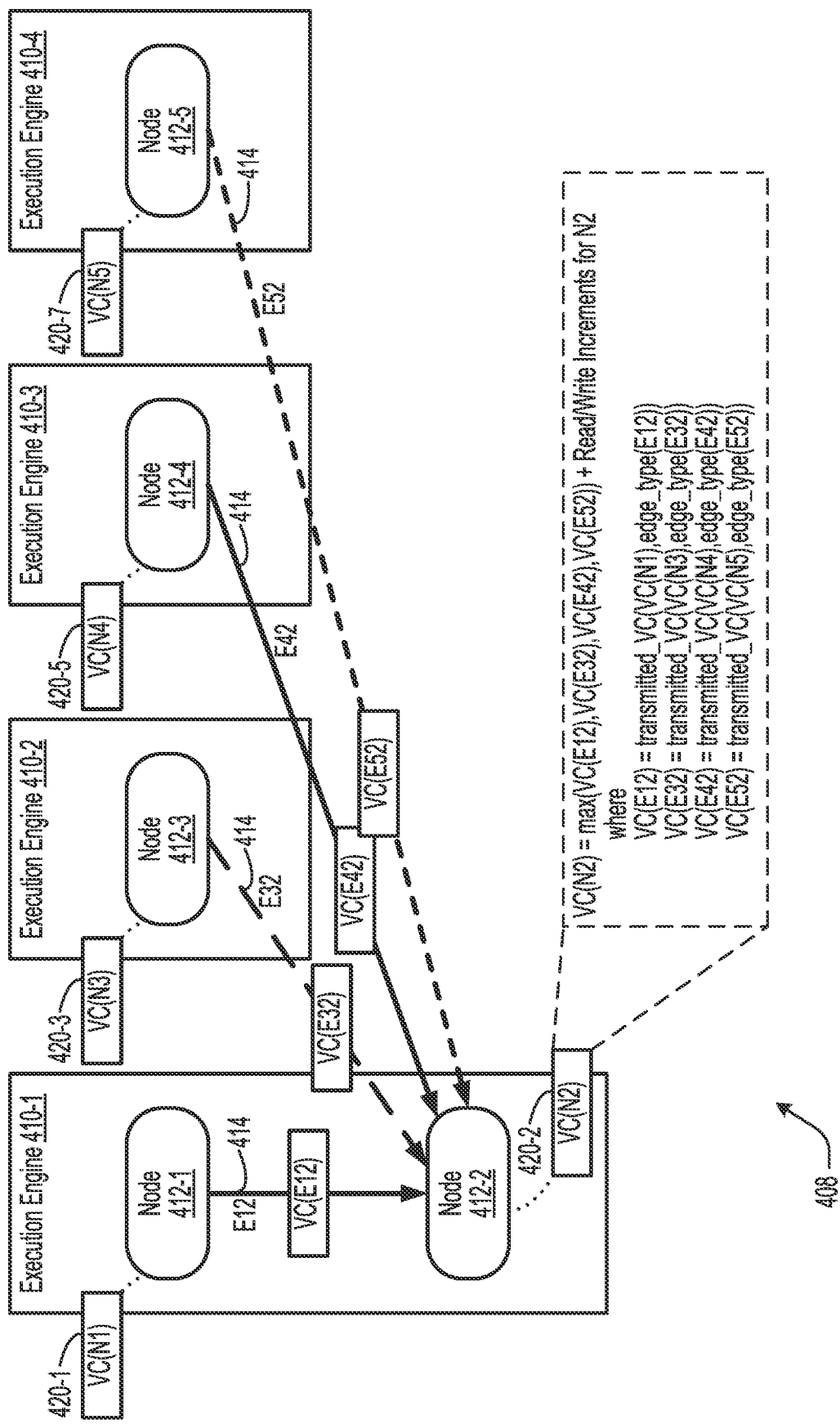
FIG. 4 illustrates an example calculation of a vector clock.

FIG. 4 illustrates an example calculation of a vector clock, in accordance with some embodiments of the present disclosure. FIG. 4 shows a computation graph 408 that includes nodes 412 connected by edges 414. Each of nodes 412 represents an operation that includes one or more instructions to be executed by one of execution engines 410. Vector clocks 420 may be calculated for nodes 412, with each of vector clocks 420 including n values.

In some embodiments, the number of values n may be equal to the result of multiplying several quantities. These quantities may include: (1) the number of execution engines 410, which may be referred to as m, (2) the number of different memories that execution engines 410 read from, (3) the number of different memories that execution engines 410 write to, and (4) the number of slices/section in the different memories. In one example, the number of values n may be equal to 64 where m is equal to 4, the number of different readable memories is equal to 2, the number of different writable memories is equal to 2, and the number of slices in the different readable or writable memories is equal to 4 (i.e., 4×2×2×4=64).

In the illustrated example, vector clock 420-2 (denoted as VC(N2)) of node 412-2 (denoted as N2) is calculated as follows. First, vector clock 420-2 is initialized with all zeros. Next, for each incoming edge 414 from connected preceding nodes (nodes 412-1, 412-3, 412-4, and 412-5), a transmitted vector clock is calculated based on the vector clock of the connected preceding node and the edge type of the incoming edge. For example, the transmitted vector clock VC(E12) along the edge E12 (the edge connecting nodes 412-1 and 412-2) is calculated as a function of VC(N1) and the edge type of edge E12 as follows:

$$VC(E12)=\text{transmitted\_VC}(VC(N1),\text{edge\_type}(E12))$$

where edge_type( ) is a function that determines an edge type of an edge and transmitted_VC( ) is a function that calculates a transmitted vector clock based on a vector clock and an edge type.

After processing the incoming edge from the first connected preceding node, the updated value of VC(N2) is calculated as:

$$\text{new } VC(N2)=\max(VC(N2),VC(E12))$$

where max( ) is a function that determines a maximum value for each of the n vector clock values. After processing the incoming edge from the next connected preceding node (node 412-3), the updated value of VC(N2) is calculated as:

$$\text{new } VC(N2)=\max(VC(N2),VC(E32))$$

where $$VC(E32)=\text{transmitted\_VC}(VC(N3),\text{edge\_type}(E32))$$

After all incoming edges are processed (including edges 414 from nodes 412-4 and 412-5), the vector clock entries that depend on node 412-2 are incremented, where the entries are incremented by a positive number, with the most efficient increment amount being 1. The incremented entries may include entries for memory slices for the particular memory that execution engine 410-1 reads from and entries for memory slices for the particular memory that execution engine 410-1 writes to.

FIGS. 5A-5E illustrate various examples of how transmitted vector clocks may be calculated for an incoming edge, in accordance with some embodiments of the present disclosure. In the illustrated examples, execution engines 510 include an activation engine and a pooling engine, and nodes 512 represent a first activation operation (Act1), a second activation operation (Act2), a first pooling operation (Pool1), and a second pooling operation (Pool2). Nodes 512 are connected by edges 514 having various edge types representing synchronization types S2S, W2S, or R2S (as indicated).

Figure 5A:
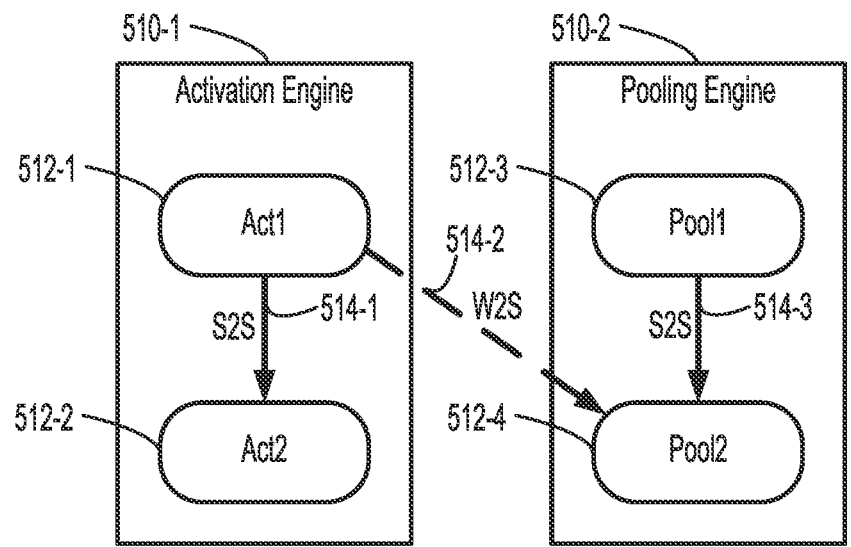
FIGS. 5A-5E illustrate various examples of how transmitted vector clocks may be calculated for an incoming edge.

FIG. 5A illustrates an example calculation of a transmitted vector clock VC(E14) for the purposes of calculating the vector clock of node 512-4, where node 512-1 is a connected preceding node. Edge E14 (connecting nodes 512-1 and 512-4 and indicated by edge 514-2) is synchronized by Act1 sending a signal on write end and Pool2 waiting for the signal. Because the edge type (synchronization type) is W2S, completion of all instruction phases of Act1 are known at Pool2 (both read and write). As such, transmitted vector clock VC(E14)=VC(N1).

Figure 5B:
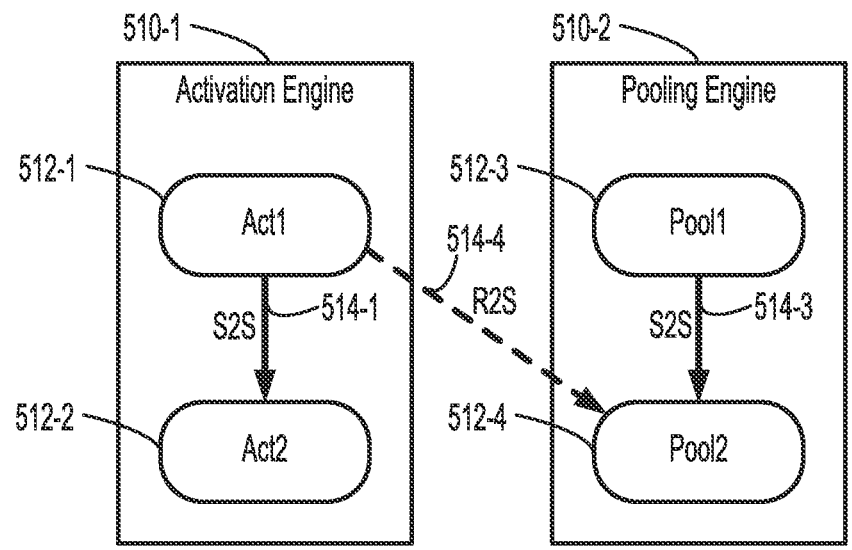

FIG. 5B illustrates an example calculation of a transmitted vector clock VC(E14) for the purposes of calculating the vector clock of node 512-4, where node 512-1 is a connected preceding node. Edge E14 (connecting nodes 512-1 and 512-4 and indicated by edge 514-4) is synchronized by Act1 sending a signal on read end and Pool2 waiting for the signal. Because the edge type (synchronization type) is R2S, completion of the reading phase of Act1 is known at Pool2. Therefore, to obtain VC(E14), VC(N1) is copied to VC(E14) and the entries for write_entries(Act1) may be decremented in VC(E14), where write_entries( ) is the vector clock entries for the input node's write operation. This signifies that Pool2 knows that Act1 read is done, but does not know that Act1 write is done.

Figure 5C:
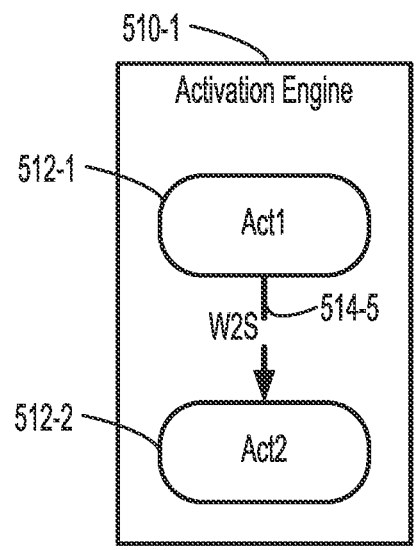

FIG. 5C illustrates an example calculation of a transmitted vector clock VC(E12) for the purposes of calculating the vector clock of node 512-2, where node 512-1 is a connected preceding node. Edge E12 (connecting nodes 512-1 and 512-2 and indicated by edge 514-5) is synchronized by Act1 sending a signal on write end and Act2 waiting for the signal. As such, transmitted vector clock VC(E12)=VC(N1).

Figure 5D:
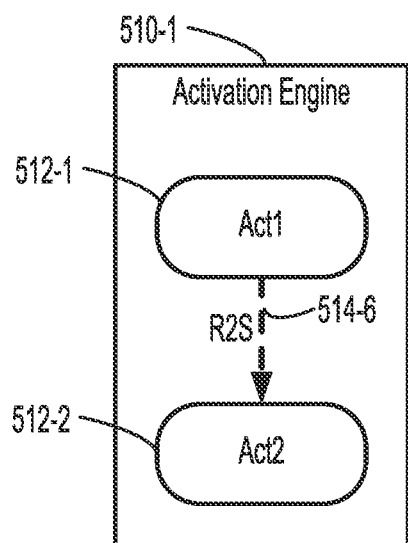

FIG. 5D illustrates an example calculation of a transmitted vector clock VC(E12) for the purposes of calculating the vector clock of node 512-2, where node 512-1 is a connected preceding node. No synchronization is needed for edge E12 (connecting nodes 512-1 and 512-2 and indicated by edge 514-6) since RE1 precedes WS2 in RE2RS. Otherwise, Act1 sends a signal on read end and Act2 waits for the signal. Edge E12 may be implemented as follows. First, if Act1 and Act2 read from a common partition, no synchronization is needed. VC(N1) may be copied to VC(E12), then the entries for write_entries(N1) may be decremented in VC(E12). This can be seen in FIG. 3E as there is a path from RE1 to WS2. Second, if Act1 and Act2 write to a common partition, no synchronization is needed. This can be seen in FIG. 3F as there is also a path from RE1 to WS2. In this case VC(E12)=VC(N1). Third, if Act1 and Act2 do not read from and do not write to a common partition, Act1 sends a signal on write end, and Act2 waits for the signal. VC(N1) may be copied to VC12, then the entries for write_entries(N1) may be decremented in VC(E12).

Figure 5E:
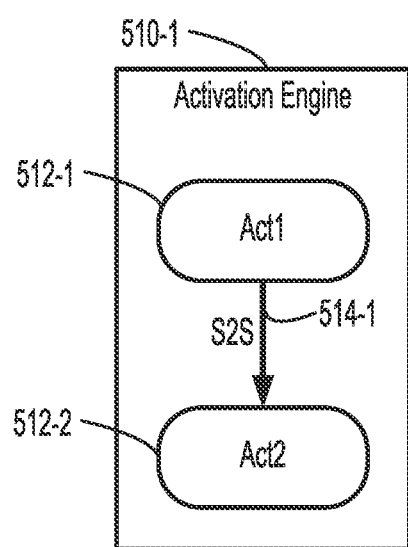

FIG. 5E illustrates an example calculation of a transmitted vector clock VC(E12) for the purposes of calculating the vector clock of node 512-2, where node 512-1 is a connected preceding node, connected by edge 514-1. Since no synchronization is needed, transmitted vector clock VC(E12)=VC(N1).

Figure 6:
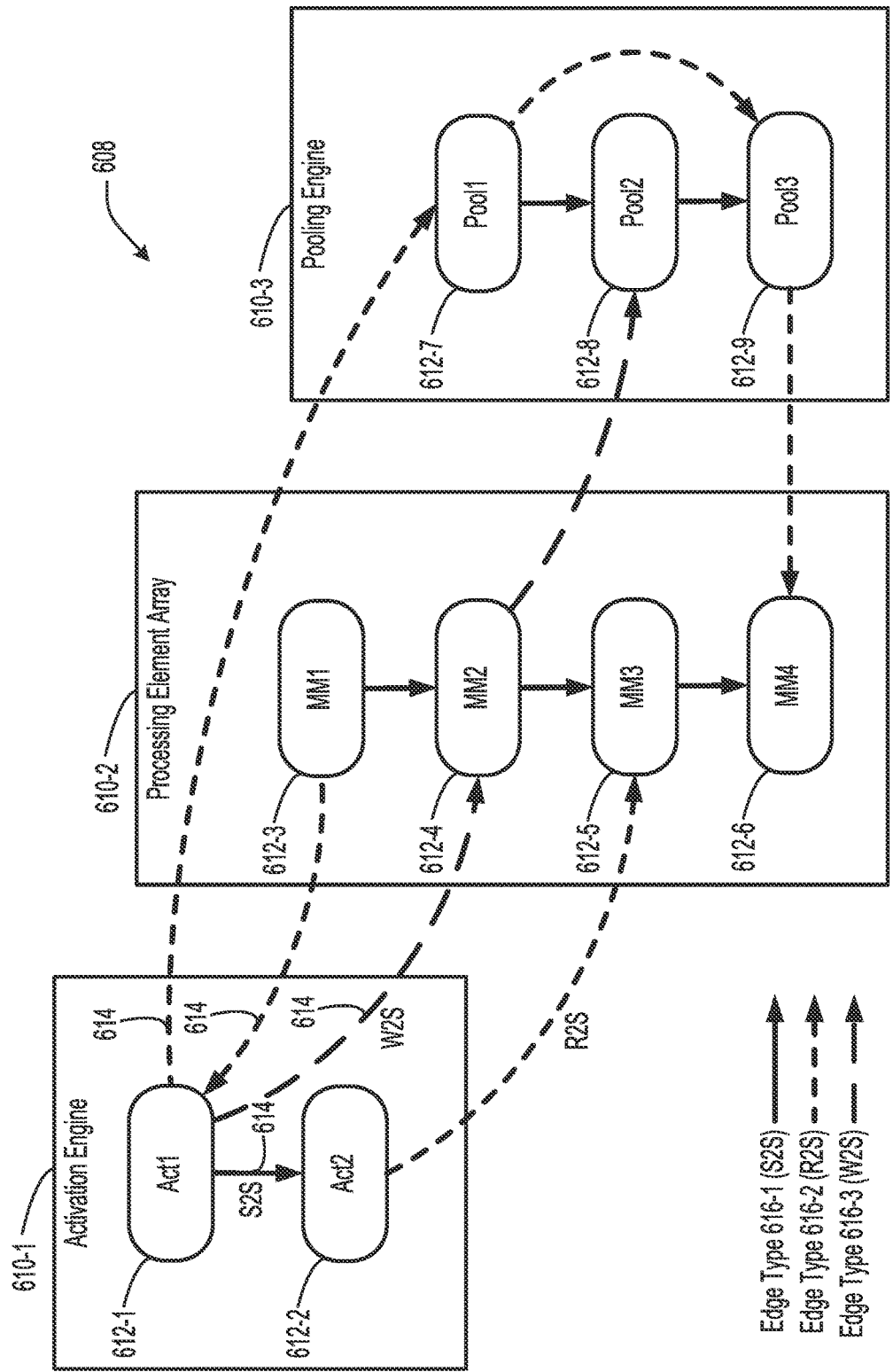
FIG. 6 illustrates an example of a computation graph corresponding to a neural network.

FIG. 6 illustrates an example of a computation graph 608 corresponding to a neural network, in accordance with some embodiments of the present disclosure. In accordance with previous examples, computation graph 608 may include various nodes 612 representing operations and being connected by edges 614. The operations of nodes 612 may be executed by execution engines 610, which include an activation engine, a processing element array, and a pooling engine. In the illustrated example, computation graph 608 is analyzed to determine that each of edges 614 is one of three edge types 616, which include S2S, R2S, and W2S edge types (and synchronization types).

In some embodiments, edges 614 between nodes 612 (or operations) within the same execution engine may be determined to be S2S edges. For example, the edges from Act1 to Act2, MM1 to MM2, and Pool1 to Pool2 may be determined to be S2S edges. Edge types may further be determined based on the type of operation (Act, MM, or Pool) for the start operation and end operation of an edge. In some embodiments, operations on one execution engine may also have R2S or W2S edges in addition to S2S edges. In the illustrated example, there is an R2S edge from Pool1 to Pool3. Note that in computation graph 608, the R2S edge from Pool1 to Pool3 is not redundant because the two S2S edges from Pool1 to Pool2 and Pool2 to Pool3 only imply that Pool1 and Pool3 have an S2S relation, but not the stronger R2S relation. In this example, the S2S edge from Pool2 to Pool3 conveys information that MM2 has finished (together with the W2S edge from MM2 to Pool2 edge), and the R2S edge from Pool1 to Pool3 conveys the information that Pool1 has finished reading.

Figure 7:
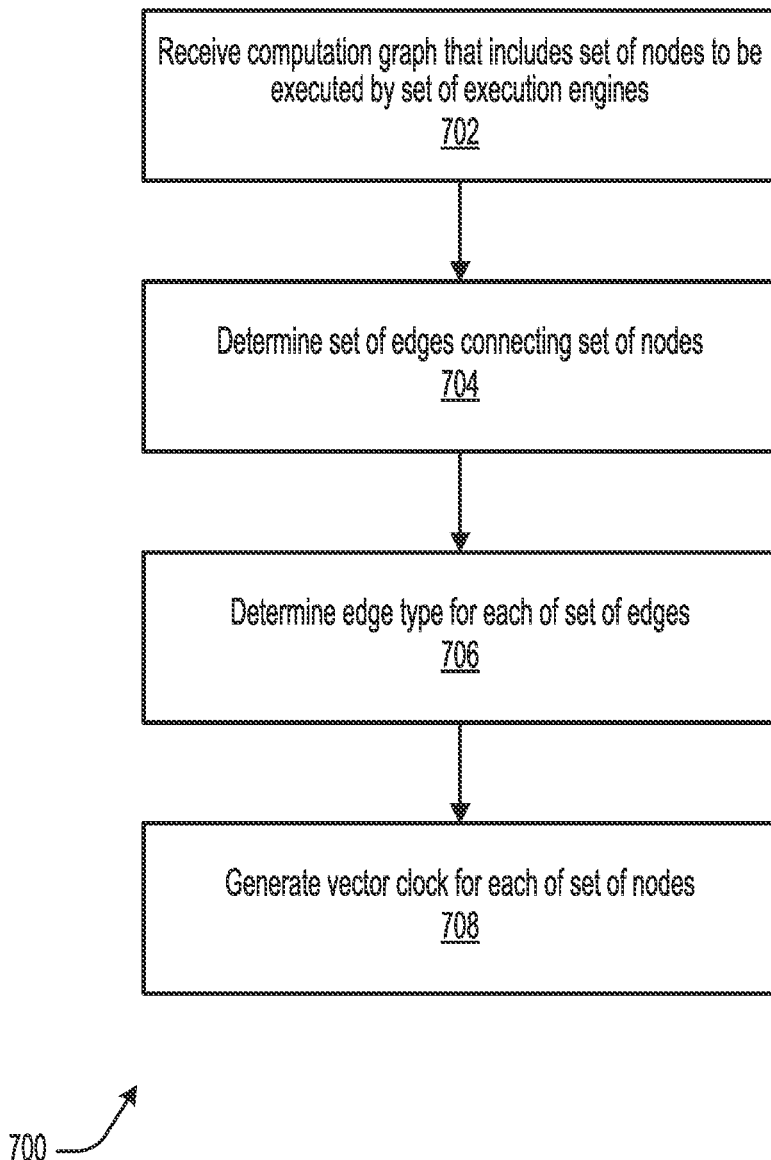
FIG. 7 illustrates an example method of modeling concurrency between a set of nodes to be executed on a set of execution engines.

FIG. 7 illustrates an example method 700 of modeling concurrency between a set of nodes to be executed on a set of execution engines, in accordance with some embodiments of the present disclosure. One or more steps of method 700 may be omitted during performance of method 700, and steps of method 700 may be performed in any order and/or in parallel. One or more steps of method 700 may be performed by one or more processors, such as those included in host system 800. Method 700 may be implemented as a computer-readable medium or computer program product comprising instructions which, when the program is executed by one or more computers, cause the one or more computers to carry out the steps of method 700. Such computer program products can be transmitted, over a wired or wireless network, in a data carrier signal carrying the computer program product.

At step 702, a computation graph (e.g., computation graphs 108, 408, 608) is received. The computation graph may include a set of nodes (e.g., nodes 112, 412, 512, 612) to be executed by a set of execution engines (e.g., execution engines 110, 410, 510, 610). Each of the set of nodes may represent an operation that includes at least one instruction to be executed by one of the set of execution engines. In some embodiments, the computation graph may be generated by a compiler (e.g., compiler 830). In some embodiments, the computation graph may correspond to a neural network and the set of execution engines may be elements of a neural network accelerator (e.g., accelerators 870, 970). In some embodiments, the computation graph may be received at a computing device, such as a host system (e.g., host system 800).

At step 704, a set of edges (e.g., edges 114, 414, 514, 614) connecting the set of nodes are determined based on the computation graph. Each of the set of edges may represent synchronization between connected nodes.

At step 706, an edge type (e.g., edge types 116, 616) for each of the set of edges is determined based on the computation graph. The edge type may indicate a type of synchronization between connected nodes. The edge type may be one of a set of possible edge types, and accordingly the type of synchronization may be one of a set of possible synchronization types. In some embodiments, the type of synchronization may indicate a level of concurrency between the connected nodes. In some embodiments, the type of synchronization may be one of S2S, RE2S, R2S, WE2S, W2S, RE2RS, WE2WS, RE2RS+WE2WS, among other possibilities.

At step 708, a vector clock (e.g., vector clocks 120, 420) for each of the set of nodes is generated. The vector clock for a particular node may be calculated based on the vector clock for each connected preceding node and the edge type for the edge that connects each connected preceding node to the particular node. In some embodiments, the vector clock for each of the set of nodes includes a set of values having a quantity (e.g., n) that is greater than a quantity (e.g., m) of the set of execution engines.

In some embodiments, method 700 may further include assigning event registers to the set of edges based on the vector clock for each of the set of nodes. In some embodiments, method 700 may further include removing redundant edges from the set of edges based on the vector clock for each of the set of nodes. In some embodiments, method 700 may further include determining that a data race condition exists based on the vector clock for each of the set of nodes.

Figure 8:
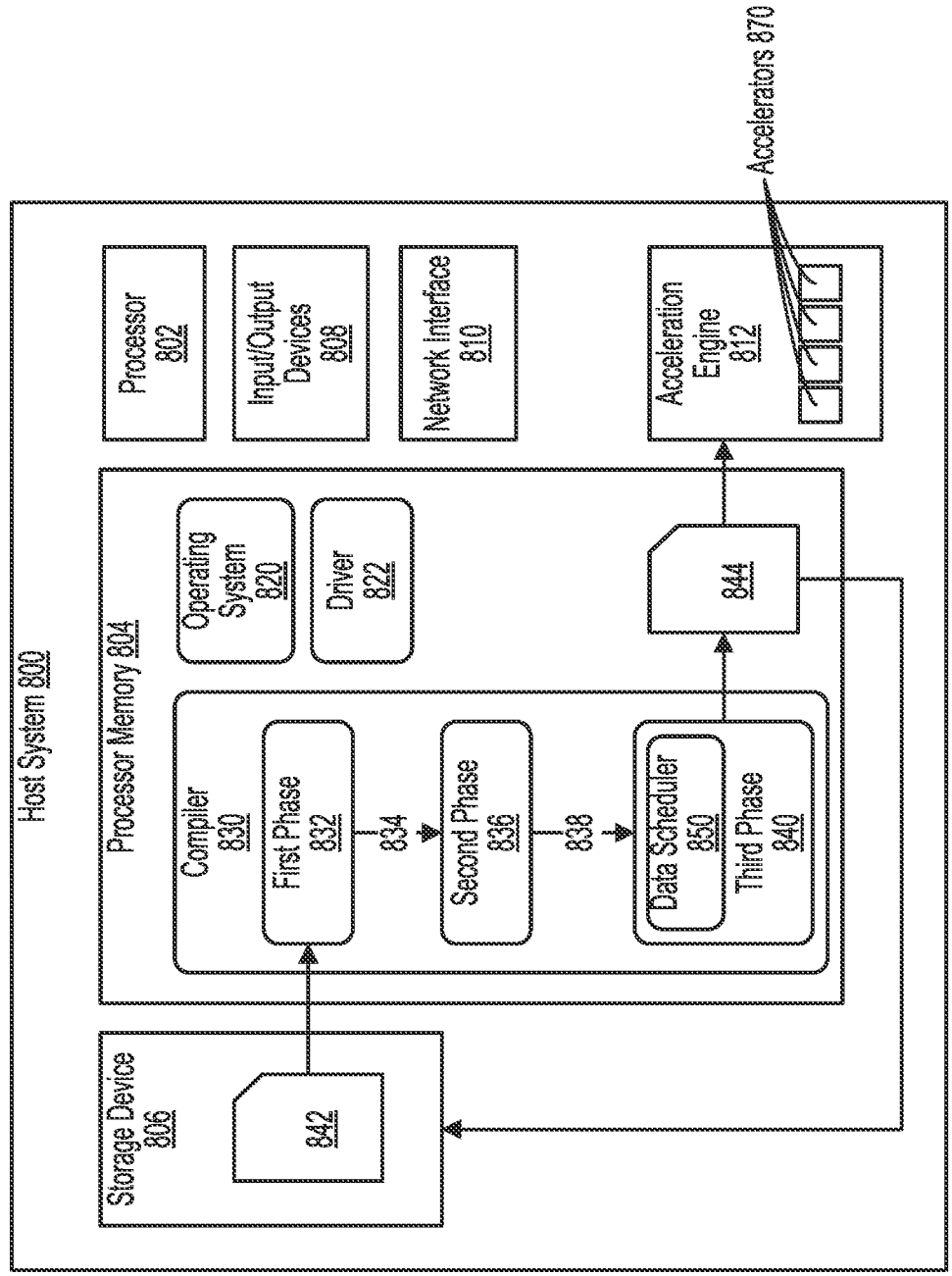
FIG. 8 illustrates an example of a host system on which a compiler can run.

FIG. 8 illustrates an example of a host system 800 on which a compiler 830 can run. The illustrated host system 800 is an example of a computing device, and includes a processor 802, a processor memory 804, at least one storage device 806, various Input/Output (I/O) devices 808, and at least one network interface 810. In the example of FIG. 8, host system 800 also includes an acceleration engine 812, which is an integrated circuit device that can accelerate certain operations or computations performed by host system 800. In various examples, host system 800 can be implemented as a server in a data center, a desktop computer, a laptop computer, a tablet computer, or a smartphone, among other examples. In some examples, operations or components discussed below as performed or included in host system 800 can be performed or included in other computer devices. For example, compiler 830 can execute on host system 800 while acceleration engine 812 is located at a different host system.

Processor 802 is an integrated circuit device that can execute program code, in the form of instructions. The program code can be used for various software applications or tools, such as an operating system 820 or compiler 830. While processor 802 is executing a program, the instructions for the program can be stored in processor memory 804. The instructions can also be stored elsewhere, such as on storage device 806, and can be loaded into processor memory 804 when needed by processor 802. Processor 802 can also use processor memory 804 for temporary storage of other data on which processor 802 is operating. In various examples, processor memory 804 is a volatile memory type, such as a type of Random Access Memory, though non-volatile memory types can, alternatively or additionally, be used for processor memory 804.

Storage device 806 is an example of a device that can include non-volatile memory. For example, storage device 806 can be a magnetic disk drive, a solid state drive, or an optical drive, among other examples. Storage device 806 can further be non-transitory, such that program code and other data stored on storage device 806 remains present when storage device 806 is not powered on.

Storage device 806 is one example of a peripheral device, which are components that can be coupled to host system 800 to add functionality to host system 800. Other examples of peripheral devices include Input/Output devices 808 and network interface 810. Input/Output devices 808 can include user input and output devices, such as keyboards, mice, touch screens, microphones, display screens, speakers, printers, and scanners, among other examples. Network interface 810, which can be implemented using a network interface card, can provide access to one or more networks. Network interface 810 can include, for example, a physical port for connecting a network cable and/or wireless antennas for communicating with Wi-Fi and/or cellular networks. Network interface 810 can also be described as an I/O device.

Acceleration engine 812 is also another type of peripheral device or I/O device. Acceleration engine 812 is a device that is purpose built to perform certain operations that can be performed by processor 802, but can be performed faster by acceleration engine 812. For example, acceleration engine 812 can include one or more neural network accelerators 870, and, as such, may be able to perform the large scale, parallel computations of a neural network more efficiently than when the computations are performed by processor 802. As another example, acceleration engine 812 can be a GPU, and may be optimized to perform the computations needed for graphics rendering. Other examples of devices that can be implemented by acceleration engine 812 include cryptographic accelerators, compression and decompression accelerators, 3-D accelerators, regular expression accelerators, security accelerators, and others.

In various examples, acceleration engine 812 can execute program code to perform certain operations. For example, when acceleration engine 812 includes one or more neural network accelerators 870, acceleration engine 812 can be programmed to execute a particular neural network, such as one that performs image recognition or one that performs machine translation. As a further example, to support the execution of a neural network, acceleration engine 812 can be programed to perform operations such as copying data for the neural network from processor memory 804 (for example) into acceleration engine 812, copying input data for the neural network from processor memory 804 into acceleration engine 812, and/or copying results from acceleration engine 812 into processor memory 804, among other examples.

To generate program code for acceleration engine 812, in various examples, host system 800 can execute compiler 830. Compilers, in general, are software programs that translate program code written in a human-readable language into a format (e.g., machine instructions) that can be read and processed by an integrated circuit device. In the example of FIG. 8, acceleration engine 812 includes one or more neural network accelerators 870 and compiler 830 is for compiling a neural network description into instructions to be executed on acceleration engine 812. When acceleration engine 812 implements a different type of accelerator, another compiler can be used.

Compiler 830 can be activated, for example, when operating system 820 receives keyboard, mouse, touchscreen, voice commands, or other inputs from Input/Output devices 808. The inputs can further include parameters for compiler 830, such as input code 842 to compile and configuration options for the compilation process. Once compiler 830 is activated, processor 802 can load the instructions for compiler 830 into processor memory 804, and can execute the instructions.

In the example of FIG. 8, compiler 830 includes a first stage 832, a second stage 836, and a third stage 840, which each perform different operations to produce compiled code 844. In other examples, compiler 830 can combine the operations of first stage 832, second stage 836, and/or third stage 840 into fewer stages, or can divide the operations of one of the stages into multiple stages.

First stage 832 can receive and process input code 842. Input code 842 can describe a program in a high-level programming language, such as Java, C++, or Tensorflow, among many other examples. Input code 842 can describe, for example, steps to perform image recognition, speech recognition, machine translation, or other operations. Input code 842 can be obtained, for example, from storage device 806. Alternatively, though not illustrated here, input code 842 may be located in processor memory 804 or can be obtained from a network location, using network interface 810. Processing of input code 842 can include sorting the operations described in input code 842 into layers, where the outputs of one layer provide the inputs to a next layer. Processing can also include identifying steps to be performed by processor 802, rather than by acceleration engine 812. For example, processor 802, through the execution of a driver 822, may need to perform steps such as configuring Direct Memory Access (DMA) descriptors for moving data into or out of acceleration engine 812, among other examples.

The output 834 of first stage 832 can be organized, for example, in the layers, nodes, and connections between nodes of a neural network. Second stage 836 can perform intermediate processing on this output 834. For example, the operations performed in any one layer, or at any one node in a layer, may be too many for acceleration engine 812 to perform at the same time. Acceleration engine 812 may, for example, have a limited amount of local storage space for the data needed for a computation, or the computations may be more than acceleration engine 812 can perform at one time. In this example, first stage 832 can break the operations of the layer or node down into smaller operations, which can fit into the acceleration engine's local memory and/or can fit into the computing capacity of acceleration engine 812. Processing of the output 834 of first stage 832 can include other steps, such as scheduling, or determining the order in which acceleration engine 812 and/or processor 802 will perform operations, among other examples.

In various examples, output 838 of second stage 836 includes the various steps to be performed by components of acceleration engine 812, in the order that the steps are to be performed. Output 838 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

Third stage 840 can operate on output 838 of second stage 836, and perform various steps before producing the instructions that are to be executed by acceleration engine 812. These steps can include, for example, removing redundant dependencies, resolving or handling dependencies between nodes by inserting synchronization instructions into the code, identifying possible optimizations in memory usage or memory bandwidth usage, and other operations.

The output of third stage 840 is compiled code 844, which may include machine instructions in binary format. In some examples, compiled code 844 can be stored in processor memory 804. Alternatively or additionally, compiled code 844 can be copied to storage device 806 or to a network location. As noted above, acceleration engine 812 may be located at a different host system, in which case compiled code 844 can be sent over network interface 810 to the other host system.

In the example of FIG. 8, host system 800 can execute a driver 822, which can also be referred to as a device driver or runtime driver, that manages acceleration engine 812. Driver 822 can provide an interface between applications executing on host system 800 (or on another host system) and acceleration engine 812. For example, driver 822 can provide an Application Program Interface (API) that defines functions for feeding input data to acceleration engine 812 and defining the operation to perform on the input data. In this and other examples, driver 822 can configure acceleration engine 812 to perform the operation. For example, driver 822 can identify a neural network that acceleration engine 812 is to execute, as well as the location in processor memory 804 or on storage device 806 where compiled code 844 for the neural network is located. Driver 822 can further load into acceleration engine 812 or cause acceleration engine 812 to load compiled code 844, can load or cause acceleration engine 812 to load the input data on which the neural network is to operate, and/or can cause acceleration engine 812 to begin executing on the input data. Once acceleration engine 812 has finished, acceleration engine 812 can notify driver 822, and driver 822 can deliver a result back to the application that requested the result.

Figure 9:
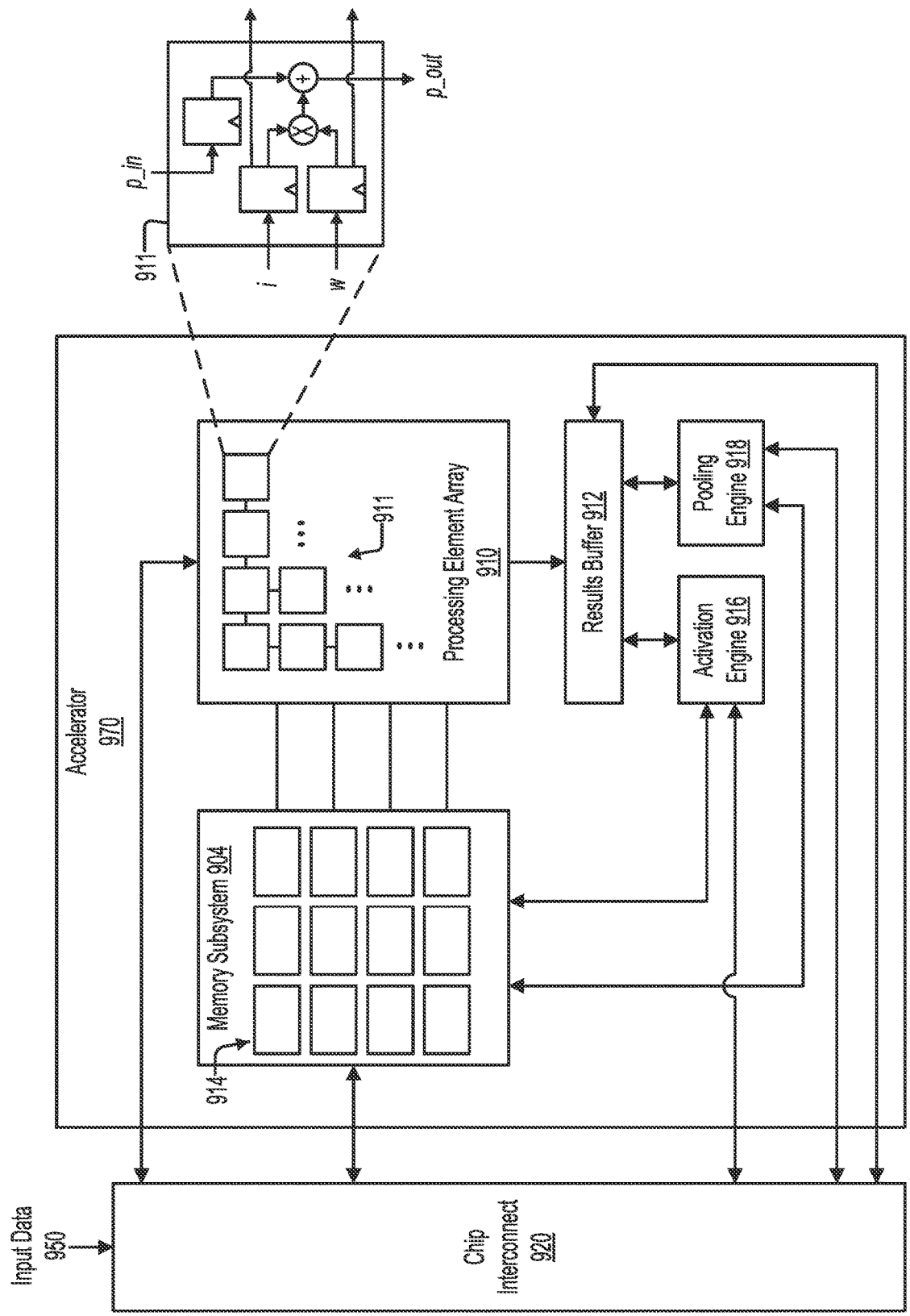
FIG. 9 illustrates an example of an integrated circuit device.

FIG. 9 illustrates an example of an integrated circuit device. The example of FIG. 9 illustrates an accelerator 970. In various examples, accelerator 970, for a set of input data (e.g., input data 950), can execute computations using a processing element array 910, an activation engine 916, and/or a pooling engine 918. In some examples, the example accelerator 970 may be an integrated circuit component of a processor, such as a neural network processor. The processor may have other integrated circuit components, including additional accelerator engines.

In various implementations, memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, memory subsystem 904 can permit simultaneous access to the read or write channels of multiple memory banks. As another example, memory subsystem 904 can include arbitration logic such that arbitration between, for example, the outputs of multiple memory banks 914 can result in more than one memory bank's output being used. In these and other examples, though globally managed by memory subsystem 904, each memory bank can be operated independently of any other.

Having memory banks 914 be independently accessible can increase the efficiency of accelerator 970. For example, values can be simultaneously read and provided to each row of processing element array 910, so that the entire processing element array 910 can be in use in one clock cycle. As another example, memory banks 914 can be read at the same time that results computed by processing element array 910 are written to memory subsystem 904. In contrast, a single memory may be able to service only one read or write at a time. With a single memory, multiple clock cycles can be required, for example, to read input data for each row of processing element array 910 before processing element array 910 can be started.

In various implementations, memory subsystem 904 can be configured to simultaneously service multiple clients, including processing element array 910, activation engine 916, pooling engine 918, and any external clients that access memory subsystem 904 over a communication fabric 920. In some implementations, being able to service multiple clients can mean that memory subsystem 904 has at least as many memory banks as there are clients. In some cases, each row of processing element array 910 can count as a separate client. In some cases, each column of processing element array 910 can output a result, such that each column can count as a separate write client. In some cases, output from processing element array 910 can be written into memory banks 914 that can then subsequently provide input data for processing element array 910. As another example, activation engine 916 and pooling engine 918 can include multiple execution channels, each of which can be separate memory clients. Memory banks 914 can be implemented, for example, using static random access memory (SRAM).

In various implementations, memory subsystem 904 can include control logic. The control logic can, for example, keep track of the address spaces of each of memory banks 914, identify memory banks 914 to read from or write to, and/or move data between memory banks 914. In some implementations, memory banks 914 can be hardwired to particular clients. For example, a set of memory banks 914 can be hardwired to provide values to the rows of processing element array 910, with one memory bank servicing each row. As another example, a set of memory banks can be hard wired to receive values from columns of processing element array 910, with one memory bank receiving data for each column.

Processing element array 910 is the computation matrix of the example accelerator 970. Processing element array 910 can, for example, execute parallel integration, convolution, correlation, and/or matrix multiplication, among other things. Processing element array 910 includes multiple processing engines 911, arranged in rows and columns, such that results output by one processing engine 911 can be input directly into another processing engine 911. Processing engines 911 that are not on the outside edges of processing element array 910 thus can receive data to operate on from other processing engines 911, rather than from memory subsystem 904.

In various examples, processing element array 910 uses systolic execution, in which data arrives at each processing engine 911 from different directions at regular intervals. In some examples, input data can flow into processing element array 910 from the left and weight values can be loaded at the top. In some examples weights and input data can flow from the left and partial sums can flow from top to bottom. In these and other examples, a multiply-and-accumulate operation moves through processing element array 910 as a diagonal wave front, with data moving to the right and down across the array. Control signals can be input at the left at the same time as weights, and can flow across and down along with the computation.

In various implementations, the number of columns in processing element array 910 determines the computational capacity of processing element array 910, and the number of rows determines the required memory bandwidth for achieving maximum utilization of processing element array 910. Processing element array 910 can have, for example, 64 columns and 428 rows, or some other number of columns and rows.

An example of a processing engine 911 is illustrated in FIG. 11 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, pin, provided either from another processing engine 911 or from a previous round of computation by processing element array 910. When starting a computation for a new set of input data, the top row of processing element array 910 can receive a fixed value for p_in, such as zero. As illustrated by this example, i and w are multiplied together and the result is summed with p_in to produce a new partial sum, p_out, which can be input into another processing engine 911. Various other implementations of processing engine 911 are possible.

Outputs from the last row in processing element array 910 can be temporarily stored in results buffer 912. The results can be intermediate results, which can be written to memory banks 914 to be provided to processing element array 910 for additional computation. Alternatively, the results can be final results, which, once written to memory banks 914 can be read from memory subsystem 904 over communication fabric 920, to be output by the system.

In some implementations, accelerator 970 includes an activation engine 916. In these implementations, activation engine 916 can combine the results from processing element array 910 into one or more output activations. For example, for a convolutional neural network, convolutions from multiple channels can be summed to produce an output activation for a single channel. In other examples, accumulating results from one or more columns in processing element array 910 may be needed to produce an output activation for a single node in the neural network. In some examples, activation engine 916 can be bypassed.

In various examples, activation engine 916 can include multiple separate execution channels. In these examples, the execution channels can correspond to the columns of processing element array 910, and can perform an operation on the outputs of a column, the result of which can be stored in memory subsystem 904. In these examples, activation engine 916 may be able to perform between 1 and n parallel computations, where n is equal to the number of columns in processing element array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 970 can include a pooling engine 918. Pooling is the combining of outputs of the columns of processing element array 910. Combining can include for example, computing a maximum value, a minimum value, an average value, a median value, a summation, a multiplication, or another logical or mathematical combination. In various examples, pooling engine 918 can include multiple execution channels that can operating on values from corresponding columns of processing element array 910. In these examples, pooling engine 918 may be able to perform between 1 and n parallel computations, where n is equal to the number of columns in processing element array 910. In various examples, execution channels of pooling engine 918 can operate in parallel and/or simultaneously. In some examples, pooling engine 918 can be bypassed.

Herein, activation engine 916 and pooling engine 918 may be referred to collectively as execution engines. Processing element array 910 is another example of an execution engine. Another example of an execution engine is a Direct Memory Access (DMA) engine, which may be located outside accelerator 970.

Input data 950 can arrive over communication fabric 920. Communication fabric 920 can connect accelerator 970 to other components of a processor, such as a DMA engine that can obtain input data 950 from an Input/Output (I/O) device, a storage drive, or a network interface. Input data 950 can be, for example one-dimensional data, such as a character string or numerical sequence, or two-dimensional data, such as an array of pixel values for an image or frequency and amplitude values over time for an audio signal. In some examples, input data 950 can be three-dimensional, as may be the case with, for example, the situational information used by a self-driving car or virtual reality data. In some implementations, memory subsystem 904 can include a separate buffer for input data 950. In some implementations, input data 950 can be stored in memory banks 914 when accelerator 970 receives input data 950.

In some examples, accelerator 970 can implement a neural network processing engine. In these examples, accelerator 970, for a set of input data 950, can execute a neural network to perform a task for which the neural network was trained. Executing a neural network on a set of input data can be referred to as inference or performing inference.

The weights for the neural network can be stored in memory subsystem 904, along with input data 950 on which the neural network will operate. The neural network can also include instructions, which can program processing element array 910 to perform various computations on the weights and the input data. The instructions can also be stored in memory subsystem 904, in memory banks 914 or in a separate instruction buffer. Processing element array 910 can output intermediate results, which represent the outputs of individual layers of the neural network. In some cases, activation engine 916 and/or pooling engine 918 may be enabled for computations called for by certain layers of the neural network. Accelerator 970 can store the intermediate results in memory subsystem 904 for inputting into processing element array 910 to compute results for the next layer of the neural network. Processing element array 910 can further output final results from a last layer of the neural network. The final results can be stored in memory subsystem 904 and then be copied out to host processor memory or to another location.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of modeling concurrency between a set of nodes to be executed on m execution engines of an integrated circuit device, the method comprising:
receiving, at a computing device, a computation graph for a neural network that includes the set of nodes, wherein each of the set of nodes includes at least one instruction to be executed by one of the m execution engines, wherein the m execution engines comprise an activation engine, a processing element array, and a pooling engine;

determining, based on the computation graph for the neural network, a set of edges connecting the set of nodes;

determining, based on the computation graph for the neural network, an edge type for each of the set of edges, wherein the edge type is one of a set of possible edge types, wherein each of the set of possible edge types indicates a type of synchronization between connected nodes, and wherein the type of synchronization indicates a level of concurrency between the connected nodes;

generating a vector clock for each of the set of nodes, wherein the vector clock for a particular node includes n values that are calculated based on (1) the n values of the vector clock for each connected preceding node of the set of nodes and (2) the edge type for the one of the set of edges that connects each connected preceding node and the particular node, wherein n is greater than m; and assigning event registers to the set of edges based on the vector clock for each of the set of nodes.

2. The method of claim 1, further comprising:
removing redundant edges from the set of edges based on the vector clock for each of the set of nodes.

3. The method of claim 1, further comprising:
determining that a data race condition exists based on the vector clock for each of the set of nodes.

4. A method comprising:
receiving a computation graph that includes a set of nodes to be executed by a set of execution engines;

determining, based on the computation graph, a set of edges connecting the set of nodes;

determining, based on the computation graph, an edge type for each of the set of edges, wherein the edge type indicates a type of synchronization between connected nodes;

generating a vector clock for each of the set of nodes, wherein the vector clock for a particular node is calculated based on the vector clock for each connected preceding node and the edge type for the one of the set of edges that connects each connected preceding node and the particular node; and assigning event registers to the set of edges based on the vector clock for each of the set of nodes.

5. The method of claim 4, wherein the computation graph corresponds to a neural network, and wherein the set of execution engines are elements of a neural network accelerator.

6. The method of claim 4, wherein the type of synchronization indicates a level of concurrency between the connected nodes.

7. The method of claim 4, wherein each of the set of nodes includes at least one instruction to be executed by one of the set of execution engines.

8. The method of claim 4, wherein the vector clock for each of the set of nodes includes a set of values that is greater in quantity than the set of execution engines.

9. The method of claim 4, further comprising:
removing redundant edges from the set of edges based on the vector clock for each of the set of nodes.

10. The method of claim 4, further comprising:
determining that a data race condition exists based on the vector clock for each of the set of nodes.

11. A non-transitory computer-readable medium comprising instructions that, when executed by a processor, cause the processor to perform operations comprising:
receiving a computation graph that includes a set of nodes to be executed by a set of execution engines;

determining, based on the computation graph, a set of edges connecting the set of nodes;

determining, based on the computation graph, an edge type for each of the set of edges, wherein the edge type indicates a type of synchronization between connected nodes;

generating a vector clock for each of the set of nodes, wherein the vector clock for a particular node is calculated based on the vector clock for each connected preceding node and the edge type for the one of the set of edges that connects each connected preceding node and the particular node; and assigning event registers to the set of edges based on the vector clock for each of the set of nodes.

12. The non-transitory computer-readable medium of claim 11, wherein the computation graph corresponds to a neural network, and wherein the set of execution engines are elements of a neural network accelerator.

13. The non-transitory computer-readable medium of claim 11, wherein the type of synchronization indicates a level of concurrency between the connected nodes.

14. The non-transitory computer-readable medium of claim 11, wherein each of the set of nodes includes at least one instruction to be executed by one of the set of execution engines.

15. The non-transitory computer-readable medium of claim 11, wherein the vector clock for each of the set of nodes includes a set of values that is greater in quantity than the set of execution engines.

16. The non-transitory computer-readable medium of claim 11, wherein the operations further comprise:
removing redundant edges from the set of edges based on the vector clock for each of the set of nodes.

17. The non-transitory computer-readable medium of claim 11, wherein the operations further comprise:
determining that a data race condition exists based on the vector clock for each of the set of nodes.

* * * * *